United States Patent
Shiu (10) Patent No.: US 7,995,364 B2
(45) Date of Patent: Aug. 9, 2011

(54) DC/DC CONVERTER CIRCUIT AND CONTROLLER THEREOF

(75) Inventor: Shian-Sung Shiu, Yonghe (TW)

(73) Assignee: Green Solution Technology Co., Ltd., Taipei County (TW)

( * ) Notice: Subject to any disclaimer, the term of this patent is extended or adjusted under 35 U.S.C. 154(b) by 405 days.

(21) Appl. No.: 12/219,967

(22) Filed: Jul. 31, 2008

(65) Prior Publication Data
US 2009/0309566 A1    Dec. 17, 2009

(30) Foreign Application Priority Data
Jun. 13, 2008  (TW) ................................ 97122050 A (51) Int. Cl.
*H02M 3/18* (2006.01)
(52) U.S. Cl. ......................................... 363/60; 363/124
(58) Field of Classification Search .......... 323/282–288; 363/21.12, 21.16, 21.03, 21.04, 16, 59, 60, 363/65, 125; 327/157, 115, 117, 151, 160
See application file for complete search history.

(56) References Cited

U.S. PATENT DOCUMENTS

| | | | | |
|---|---|---|---|---|
| 5,371,667 A | * | 12/1994 | Nakao et al. | 363/124 |
| 6,400,211 B1 | * | 6/2002 | Yokomizo et al. | 327/536 |
| 6,977,828 B2 | * | 12/2005 | Wada | 363/60 |

FOREIGN PATENT DOCUMENTS

| | | |
|---|---|---|
| JP | 2000-166220 A | 6/2000 |
| JP | 2001-202783 A | 7/2001 |
| JP | 2002-233135 A | 8/2002 |
| JP | 2003-70236 A | 3/2003 |
| JP | 2004-48880 A | 2/2004 |
| JP | 2005-20971 A | 1/2005 |
| JP | 2005-192350 A | 7/2005 |
| JP | 2005-278383 A | 10/2005 |
| JP | 2007-20247 A | 1/2007 |
| JP | 2007-97251 A | 4/2007 |
| JP | 2007-330049 A | 12/2007 |

* cited by examiner

Primary Examiner — Rajnikant B Patel
(74) Attorney, Agent, or Firm — Rosenberg, Klein & Lee (57) ABSTRACT

The present invention uses a multi-phase oscillator or a mono-stable circuit in order to charge the output instantly or within an acceptable time period when a charge pump circuit is in a PFM mode and an output voltage is below a preset voltage level. Therefore, the present invention avoids the problem of charging the output in an unacceptable time delay thereby achieving the advantage of reducing the voltage ripple at the output.

21 Claims, 5 Drawing Sheets

DC/DC CONVERTER CIRCUIT AND CONTROLLER THEREOF

BACKGROUND OF THE INVENTION

1. Field of the Invention

The present invention is related to a DC/DC converter circuit and controller thereof; and in particular, to a charge pump control circuit and controller thereof.

2. Description of Related Art

Figure 1:
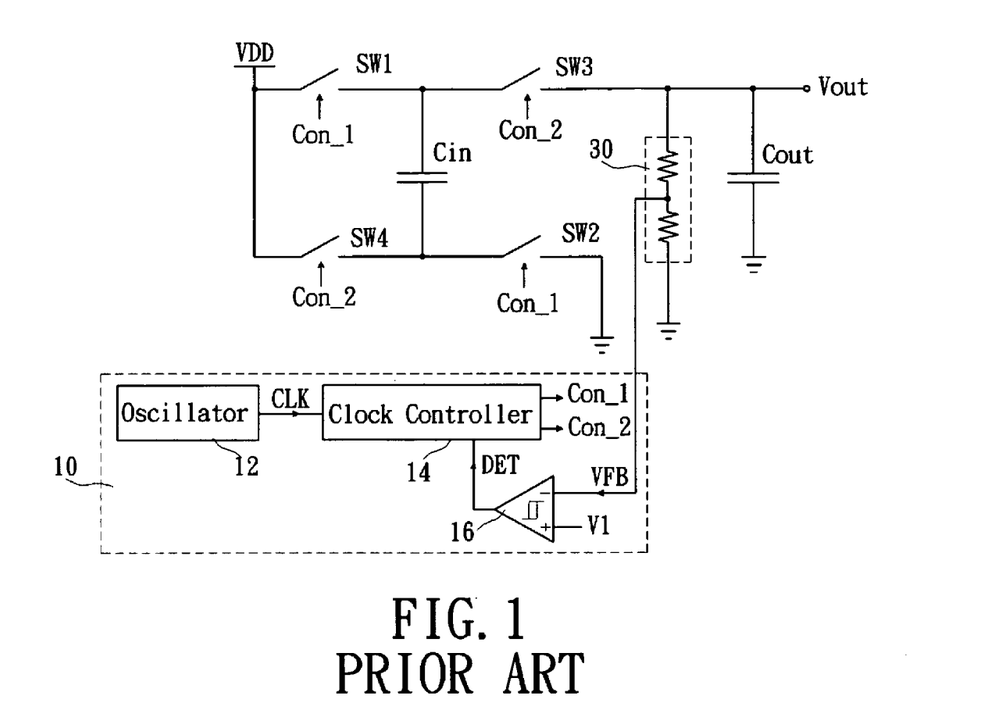
FIG. 1 is a circuit diagram of a conventional charge pump control circuit.

Refer first to FIG. 1, which shows a circuit diagram of a conventional charge pump control circuit (also commonly known as switched capacitor converter). The illustrated charge pump control circuit comprises a full-bridge switching circuit, a first capacitor Cin, a second capacitor Cout, a voltage feedback circuit 30 and a control component 10. The full-bridge switching circuit consists of four transistor switches SW1~SW4 controlled by the control signals Con_1, Con_2 sent from the control component 10. When the control signal Con_1 is high, the transistor switches SW1, SW2 become conducting and a first conducting path is accordingly formed, and the first capacitor Cin stores the electric power transferred from an input power source VDD through the first conducting path; whereas, when the control signal Con_2 is high, the transistor switches SW3, SW4 become conducting and a second conducting path is formed, the first capacitor Cin transfers the electric power to the second capacitor Cout through the second conducting path, such that the second capacitor Cout generates an output voltage Vout to the load (not shown).

The control component 10 comprises an oscillator 12, a clock controller 14 and a hysteresis comparator 16. The hysteresis comparator 16 compares the voltage feedback signal VFB generated by the voltage feedback circuit 30 with a reference voltage V1, and accordingly generates a detection signal DET. The clock controller 14 receives the detection signal DET and a clock signal CLK generated by the oscillator 12, and generates in a time-division fashion the control signals Con_1, Con_2 based on the level of the received clock signal CLK.

Figure 2:
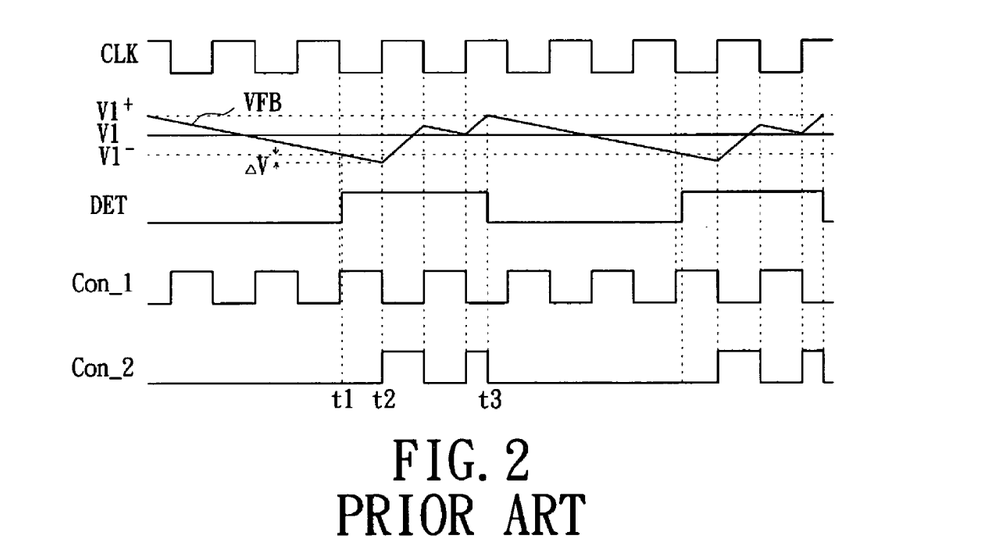
FIG. 2 is a timing diagram of the signals of the charge pump control circuit shown in FIG. 1.

Next, refer to FIG. 2, wherein a timing diagram of the signals of the charge pump control circuit depicted in FIG. 1 is shown. At the time point t1, the voltage feedback signal VFB is lower than the reference voltage V1⁻, and at this moment the detection signal DET transits from low level to high level. However, the clock signal CLK is at low level, which is the time window for generating the control signal Con_1, and the control component 10 outputs a high control signal Con_1, a low control signal Con_2, and the second conducting path is open, thus the first capacitor Cin is not allowed to transfer power to the second capacitor Cout. This causes the output voltage Vout to fall consistently until the time point t2 is reached. At time point t2, the clock signal CLK is high; i.e., the time window for generating the control signal Con_2, and the control component 10 outputs a low control signal Con_1 and a high control signal Con_2, and the first capacitor Cin transfers power to the second capacitor Cout through the second conducting path, such that the output voltage Vout starts to rise again until the reference voltage V1⁺ (at time point T3) is reached. Whereas, during the period of time from time point t1 to time point t2, the output voltage Vout keeps falling, and the maximum difference from the reference voltage V1⁻ can be up to ΔV. As a result, the output voltage ripple in the conventional charge pump control circuit can not be controlled within an expected range that is presented by a greater voltage ripple, and this situation also occurs in circuits with the same operating mode (i.e. circuits that has the generation time point of control signal determined by the clock signal CLK).

SUMMARY OF THE INVENTION

In view of the above-mentioned issues in the conventional charge pump control circuit, the present invention provides a DC/DC converter circuit and controller thereof, which, upon the detection of the output voltage being lower than a preset value, may immediately or within an acceptable duration of time transfer power to the output end to allow the output voltage to rise up; therefore, compared with the conventional charge pump control circuit, this may reduce the undesirable voltage ripple.

To achieve the aforementioned objectives, the present invention provides a DC/DC converter circuit, comprising a capacitor, a switching circuit, an output energy storing unit and a controller. The capacitor is coupled to an input power source, the switching circuit is coupled to the capacitor, and the output energy storing unit is coupled to the switching unit and provides electric power to a load. The controller controls the switching circuit based on a feedback signal indicating the state of the output energy storing unit, allowing the switching circuit to form a first conducting path and a second conducting path, so the input power source can transfer the electric power to the capacitor through the first conducting path, and the capacitor can transfer the electric power to the output energy storing unit through the second conducting path. Herein the controller determines whether the state of the output energy storing unit is currently in the first state or else in the second state according to the feedback signal, and keeps the energy storage remaining above a preset energy storage when the output energy storing unit is in the first state; otherwise, once the output energy storing unit enters into the second state, the controller immediately enables the capacitor to transfer the electric power to the output energy storing unit.

The present invention also provides a DC/DC converter circuit, comprising an input energy storing unit, a switching circuit, an output energy storing unit and a controller. The input energy storing unit is coupled to an input power source, the switching circuit is coupled to the input energy storing unit, and the output energy storing unit is coupled to the switching circuit and provides electric power to a load. The controller controls the switching circuit based on a feedback signal indicating the voltage in the output energy storing unit. Herein the controller comprises a detection unit, an oscillator and a control unit. The detection unit generates a detection signal based on the feedback signal. The oscillator generates a plurality of clock signals, and each clock signal has the same frequency but with different phases. The control unit includes a multiplexer which receives the plurality of clock signals and selects to output one of the plurality of clock signals according to the detection signal; the control unit generates a first control signal and a second control signal based on the selected clock signal and the detection signal, in which the first control signal controls the switching circuit to allow the input power source to transfer the electric power to the input energy storing unit, while the second control signal controls the switching circuit to allow the input energy storing circuit to transfer the electric power to the output energy storing unit.

The present invention furthermore also provides a charge pump controller used to control the switching circuit in a charge pump circuit, wherein the charge pump controller comprises a detection unit, an oscillator and a control unit. The detection unit generates a detection signal based on a feedback signal indicating the state of a load. The oscillator generates a plurality of clock signals, and each clock signal has the same frequency but with different phases. The control unit includes a determination selection circuit, which receives the plurality of clock signals and outputs one of the clock signals as a reference clock signal, and the control unit controls the switching of the switching circuit based on the reference clock signal and the detection signal. Therein, when the feedback signal indicates that the output of the charge pump circuit is lower than a preset output voltage, the determination selection circuit then re-selects one of the clock signals as the reference clock signal based on the detection signal.

The Summary illustrated supra and subsequent Detailed Descriptions set out infra are both for further explaining the scope of the present invention. Other objectives and advantages relating to the present invention will be construed as well in the following texts and appended drawings.

DETAILED DESCRIPTION OF THE PREFERRED EMBODIMENTS

Figure 3:
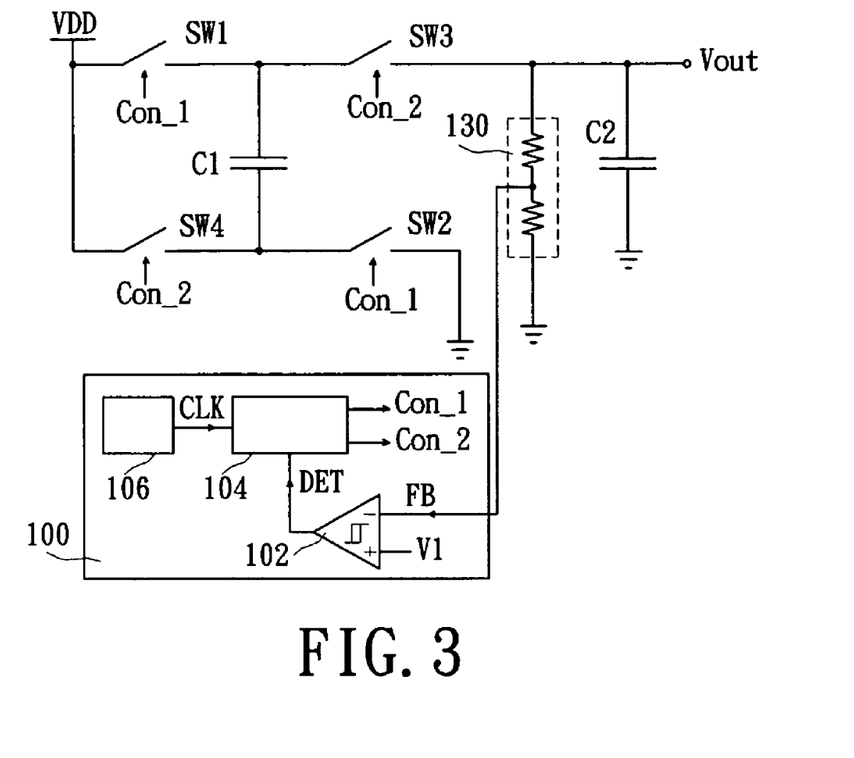
FIG. 3 is a circuit diagram of a DC/DC converter circuit in a first preferred embodiment according to the present invention.

Refer now to FIG. 3, wherein a circuit diagram of a DC/DC converter circuit in a first preferred embodiment according to the present invention is shown. The depicted DC/DC converter circuit comprises a switching circuit, an input energy storing unit C1, an output energy storing unit C2, a feedback circuit 130 and a controller 100, wherein the input energy storing unit C1 and the output energy storing unit C2 are capacitors. The switching circuit comprises semiconductor switches, such as Metal Oxide Semiconductor (MOS), Insulated-Gate Bipolar Transistor (IGBT), etc., which is coupled to the input energy storing unit C1, the output energy storing unit C2 and an input power source VDD, so as to transfer electric power from the input power source VDD to the input energy storing unit C1 for storage according to a control signal Con_1 generated by the controller 100, as well as to release the energy stored in the input energy storing unit C1 to the output energy storing unit C2 based on a control signal Con_2 generated by the controller 100. The output energy storing unit C2 stores the energy released from the input energy storing unit C1, and provides an output voltage Vout to a load (not shown). The feedback circuit 130 is coupled to the output energy storing unit C2 in order to generate a feedback signal FB indicating the voltage in the output energy storing unit C2. The controller 100 generates the control signals Con_1, Con_2 according to the feedback signal FB to control the operations of the switching circuit. In the present embodiment, the switching circuit is a full-bridge switching circuit, comprising switches SW1, SW2, SW3, and SW4. The control signal Con_1 from the controller 100 controls the conductance of the switches SW1, SW2 to form a first conducting path, so as to electrically connect the input power source VDD and the input energy storing unit C1; and the control signal Con_2 from the controller 100 controls the conductance of the switches SW3, SW4 to form a second conducting path, so as to electrically connect the input energy storing unit C1 and the output energy storing unit C2.

The controller 100 (also referred to as the charge pump controller in Summary) comprises a comparator 102, a control unit 104 and an oscillator 106. The comparator 102 (also referred to as the detection unit in summary) compares the feedback signal FB generated by the feedback circuit 130 with the reference voltage V1 in order to generate a detection signal DET. Therein the comparator 102 is preferably a hysteresis comparator. The oscillator 106 generates at least a clock signal (in the present embodiment, a single clock signal is generated). The control unit 104 receives the detection signal DET and the clock signal CLK generated by the oscillator 106, and generates in a time-division fashion the control signals Con_1, Con_2 for controlling the switching circuit based on the clock signal CLK and the detection signal DET, such that, in a time-division fashion, the input power source VDD can transfer the electric power to the input energy storing unit C1 and the input energy storing unit C1 can transfer the electric power to the output energy storing unit C2.

Figure 4:
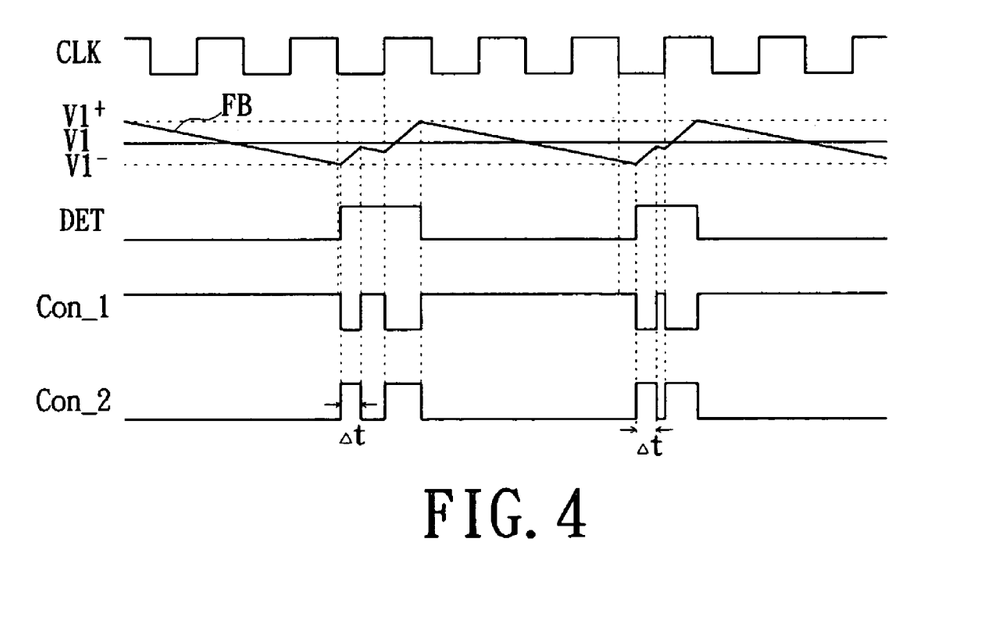
FIG. 4 is a timing diagram of the signals in the embodiment shown in FIG. 3.

Refer now to FIG. 4, wherein a timing diagram of the signals in the embodiment shown in FIG. 3 is shown. When the feedback signal FB rises to the reference voltage $V1^+$, the detection signal DET transits to low level, indicating the state of the output energy storing unit C2 is in a first state of energy release. At this time, the control signal Con_1 is high and the control signal Con_2 is low, thus the switches SW1, SW2 are conducting to form the first conducting path, allowing the input power source VDD to transfer the electric power to the input energy storing unit C1 for storage; meanwhile, the switches SW3, SW4 are cut-off to break the second conducting path and the output energy storing unit C2 releases energy to the load. When the output energy storing unit C2 gradually releases energy, causing the feedback signal FB to fall to the level of reference $V1^-$, the detection signal DET transits to high level, indicating the state of the output energy storing unit C2 is in a second state of energy storage, and the clock signal CLK is at low level. In a prior art circuit, suppose the detection signal DET transits to high, the clock signal CLK is low, then it is required to wait only until the clock signal CLK becomes high, after that the switches SW3, SW4 can become conducting to form the second conducting path to allow the output energy storing unit C2 to start energy storage. In other word, in a prior art circuit, when the detection signal DET is high and the clock signal CLK is low, since the switches SW1, SW2 are conducting while the switches SW3, SW4 are cut-off, as a result, the output voltage VOUT continues to fall and thus generates greater ripple values. On the other hand in the present invention, when the reference signal FB falls to the level of reference voltage $V1^-$, the control unit 104 immediately generates a control signal Con_1 of low level and a control signal Con_2 of high level for a period of time Δt.

Herein the time period Δt is a period of time Δt with fixed duration, a duty cycle determined according to the cycle of the clock signal CLK or a duration determined by the phase of the clock signal CLK. At this time, the switches SW3, SW4 are conducting and form a second conducting path to allow the output energy storing unit C2 to start to store energy, until the feedback signal FB rises up and reaches the reference voltage $V1^+$. When the feedback signal FB is has risen to the reference voltage $V1^+$, the state of the output energy storing unit return to the first state of energy release, thus the cycle repeats to allow the feedback signal FB to be maintained between the reference voltage $V1^-$ and the reference voltage $V1^+$. When the state of the output energy storing unit is in the first state, the control signal Con_1 may continue to control the switching circuit switching, as in the prior art, in order to allow the input energy storing unit C1 to keep storing energy above a preset energy storage amount, and the preferred approach is as the one illustrated in the present embodiment, in which the control signal Con_1 is maintained at high level, allowing switches SW1, SW2 to keep in conductance, thus reducing possible switching losses in the switches.

Figure 5:
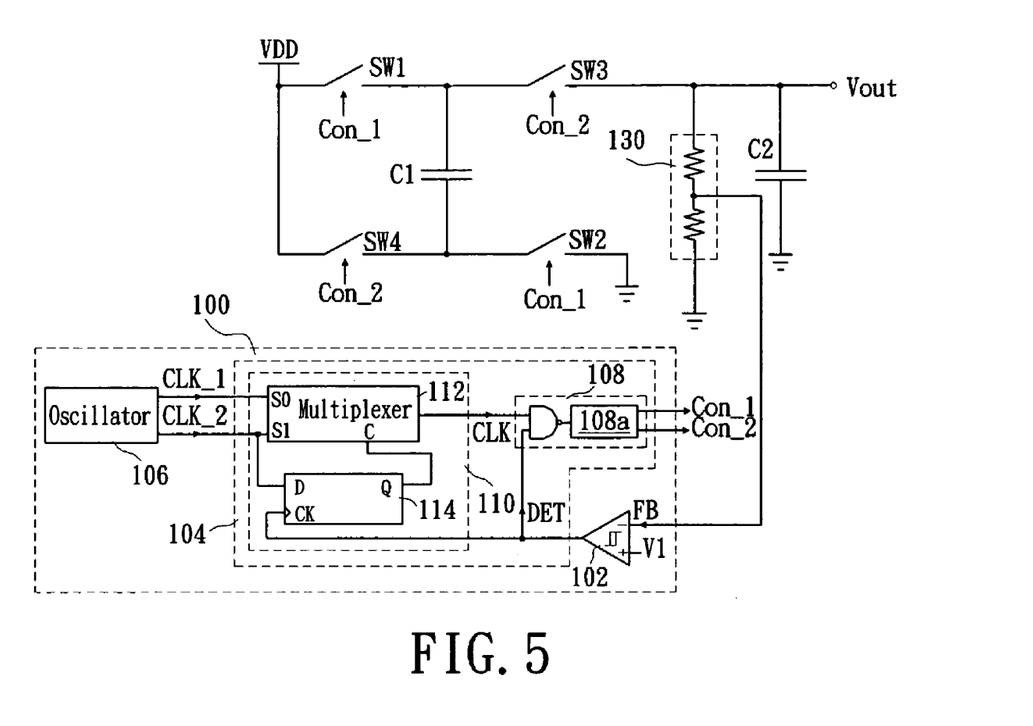
FIG. 5 is a circuit diagram of a DC/DC converter circuit in a second preferred embodiment according to the present invention.

Refer now to FIG. 5, wherein a circuit diagram of a DC/DC converter circuit in a second preferred embodiment according to the present invention is shown. In the present embodiment, the oscillator 106 generates the clock signals CLK1, CLK2 which are opposite in phase, and the control unit 104 comprises a signal selection unit 110 and non-overlapping signal generating unit 108, wherein the signal selection unit 110 (also referred to as determination selection circuit in Summary) selects one of the clock signals CLK1, CLK2 based on the detection signal DET to output it as the reference clock signal CLK, and the non-overlapping signal generating unit 108 receives the reference clock signal CLK and the detection signal DET to generate the control signals Con_1, Con_2. The signal selection unit 110 comprises a multiplexer 112 and a D latch circuit 114, wherein the triggering end CK of the D latch circuit 114 receive the detection signal DET, and the setting end D of the D latch circuit 114 receives the clock signal CLK2. When the detection signal DET transits to high, and if the clock signal CLK2 is low at this moment, then the output end Q outputs a low level signal which makes the multiplexer 112 select the clock signal CLK1 for output; however, if the clock signal CLK2 is high, then the output end Q outputs a high level signal which makes the multiplexer 112 select the clock signal CLK2 as the output. The non-overlapping signal generating unit 108 comprises a NAND gate and a non-overlapping unit 108a, wherein the NAND gate receives the reference clock signal CLK and the detection signal DET and operates to output to the non-overlapping unit 108a, and the non-overlapping unit 108a generates non-overlapping control signals Con_1, Con_2 based on the output of the NAND gate, so as to avoid simultaneous conduction on the switches SW1, SW2, SW3, SW4, causing possibly damages to the circuit.

Figure 6:
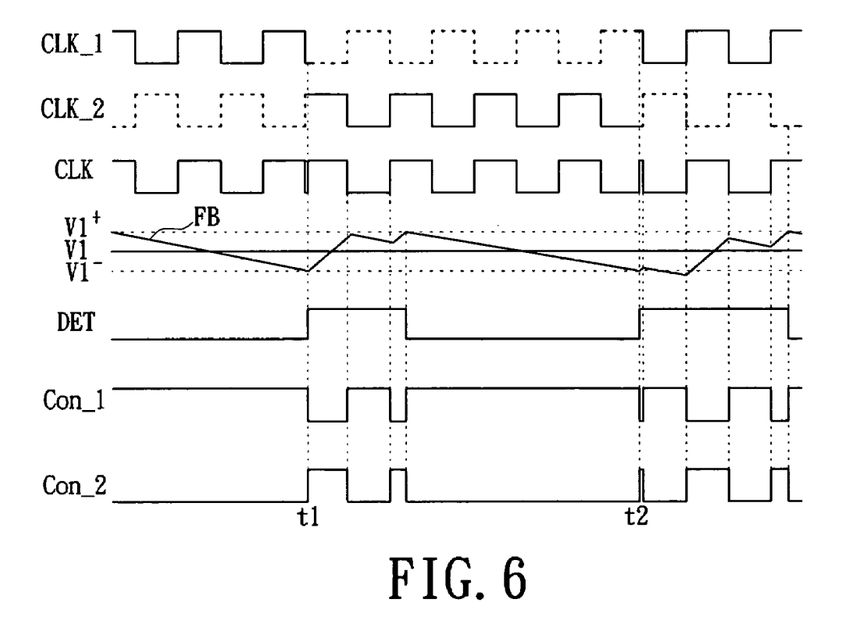
FIG. 6 is a timing signal diagram of the signals in the embodiment shown in FIG. 5.

Refer now to FIG. 6, wherein a timing diagram of the signals in the embodiment shown in FIG. 5 is shown. Before the time point t1, the state of the output energy storing unit C2 is in a first state of energy release, and at this moment the signal selection unit 110 selects the clock signal CLK1 as the reference clock signal CLK for output (in the Figure, solid line represents the selected signal and dash line represents the non-selected signal). At the time point t1, the feedback signal FB drops down to the reference voltage $V1^-$ and the detection signal DET transits to high, allowing the signal selection unit 110 to perform signal selection. Since the clock signal CLK1 is at low level but the clock signal CLK2 is at high level, as a result the signal selection unit 110 selects the clock signal CLK2 as the reference clock signal CLK for output. Therefore, the non-overlapping signal generating unit 108 immediately outputs the control signal Con_1 of low level and the control signal Con_2 of high level, with the output energy storing unit C2 enters into the second state of energy storage. When the feedback FB rises up again to the reference voltage $V1^+$, and the state of the output energy storing unit C2 returns to the first state of energy release; then the time point t2 is reached, the feedback signal FB descends to the reference voltage $V1^-$, and the state of the output energy storing unit C2 comes back to the second state of energy storage, thus cycle repeats.

Figure 7:
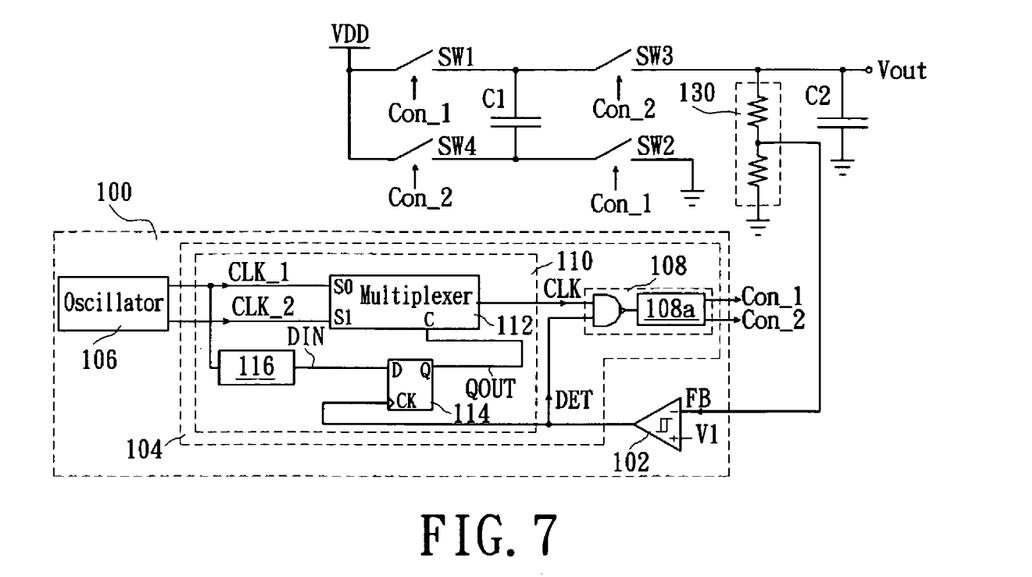
FIG. 7 is a circuit diagram of a DC/DC converter circuit in a third preferred embodiment according to the present invention.

Refer now to FIG. 7, a circuit diagram of a DC/DC converter circuit in a third preferred embodiment according to the present invention is shown. Compared with FIG. 5, the signal selection unit 110 of FIG. 7 (also referred to as determination selection circuit in Summary) comprises an additional delay circuit 116 coupled between the oscillator 106 and the D latch circuit 114. The delay circuit 116; delays the clock signal CLK1 by a delay time (delay, see FIG. 8), then has it outputted as a clock delay signal DIN. The D latch circuit 114 outputs a determination signal QOUT based on the clock delay signal DIN and the detection signal DET, causing the multiplexer 112 to accordingly select to output the clock signal CLK1 or CLK2. In the present embodiment, the delay circuit 116 is added to avoid the time point t2 as shown in FIG. 6, in which the clock signal CLK1 is selected but the control signal Con_2 sustains at high level merely for a very short duration, then transiting to low level which causes the feedback signal FB once again drops down below the reference voltage $V1^-$. In the present embodiment, the clock delay signal DIN is employed for determining the phases of the clock signals CLK1, CLK2, so as to decide whether each of them is about to transit to low even though currently at high; if yes, then it is avoided being selected as the reference clock signal CLK for output. Therefore, the delay time (delay) can prevent the problem of insufficient energy storage in the output energy storing unit C2 due to short duration of being high in the control signal Con_2 for the first time when the output energy storing unit C2 enters into the second state of energy storage, whose settings may be based on various applications (e.g. different loads, charging rates in the output energy storing unit C2 and the like); as such, it can be configured as a duration of fixed length in time, or alternatively as a period of time of a constant duty cycle according to the clock signal CLK1.

Figure 8:
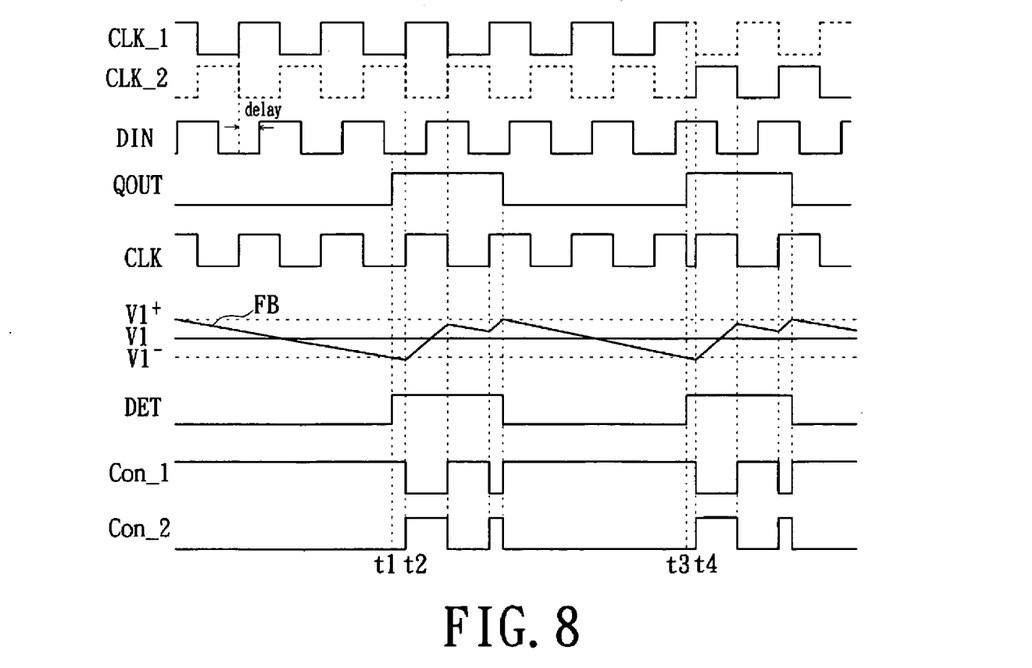
FIG. 8 is a timing signal diagram of the signals in the embodiment shown in FIG. 7.

Refer now to FIG. 8, wherein a timing diagram of the signals in the embodiment shown in FIG. 7 is shown. At time point t1, the detection signal DET transits to high. At this moment, the clock signal CLK2 is high but the clock delay signal DIN is low, indicating the clock signal CLK2 is about to transit from high level to low level; consequently, the clock signal CLK1 is still selected as the reference clock signal CLK for output. At time point t2, the reference clock signal CLK transits to high, and the control signal Con_2 also changes to high, causing the input energy storing unit C1 to start to transfer energy to the output energy storing unit C2. At time point t3, the detection signal transits again to high. Now the clock signal CLK1 is high but the clock delay signal DIN is high as well, indicating the clock signal CLK1 is about to transit from high to low; therefore, the signal selection unit 110 selects the clock signal CLK2 as the reference clock signal CLK for output. At time point t4, as the reference clock signal CLK transits to high, the control signal Con_2 also changes to high, allowing the input energy storing unit C1 to start to transfer energy to the output energy storing unit C2. Accordingly, although the feedback signal is lower than the reference voltage V1⁻ during the durations of the time points t1-t2 and time points t3-t4, compared with prior art the durations thereon are still shorter, it is thus possible to output lower output voltage ripples, the problem of insufficient energy storage duration for the first time as the output energy storing unit C2 enters into the second state of energy storage can be avoided.

Certainly, the oscillator of the present invention may also generate two or more clock signals and these clock signals have the same frequency but of different phases. The multiplexer in the control unit 104 receives these clock signals, and selects the suitable clock signal based on the phases of these clock signals and the detection signal DET as the reference clock signal for output, in order to avoid the problem of insufficient energy storage for the first time when the output energy storing unit C2 enters into the second state. Herein the present embodiment is only used to illustrate the present invention but not to restrict the scope of the present invention thereto.

Figure 9:
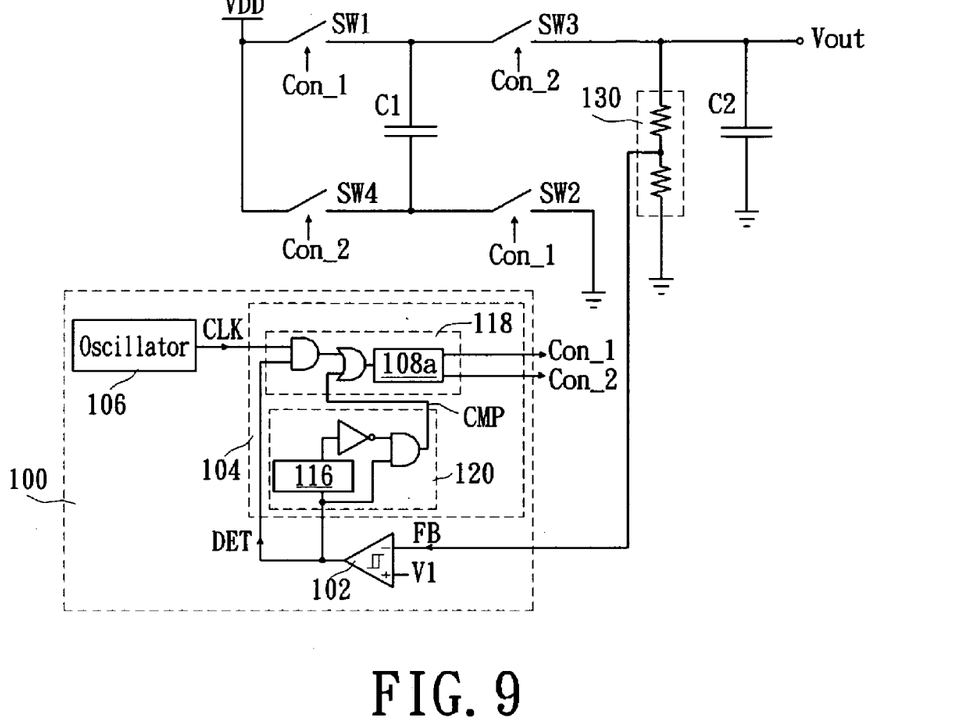
FIG. 9 is a circuit diagram of a DC/DC converter circuit in a fourth preferred embodiment according to the present invention.
Figure 10:
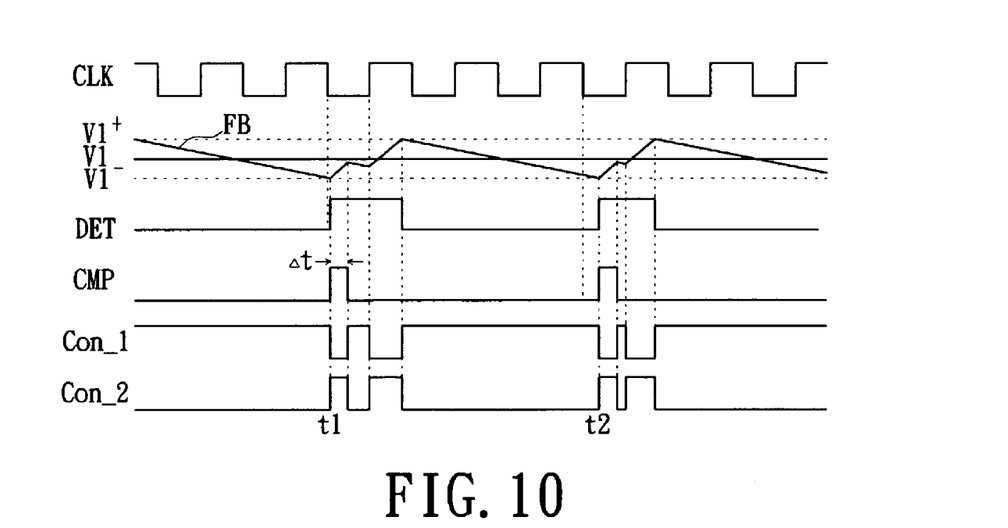
FIG. 10 is a timing signal diagram of the signals in the embodiment shown in FIG. 9.

Refer now to FIG. 9, wherein a circuit diagram of a DC/DC converter circuit in a fourth preferred embodiment according to the present invention is shown. In the present embodiment, the signal selection unit 110 comprises a non-overlapping signal generating unit 118 and a triggering circuit 120. The triggering circuit 120 immediately generates a pulse signal CMP when the detection signal DET transits to high which indicates the output energy storing unit C2 enters into the second state, allowing the control unit 104 to generate a control signal Con_2 of high level having a preset time length or for a preset duty cycle right away, such that the output energy storing unit C2 stores energy immediately. The triggering circuit 120 may be a mono-stable circuit, comprising a delay circuit 116, an inverter and an AND gate, wherein the time delay setting for the delay circuit 116 can be of a preset time length, or a preset duty cycle set in accordance with the clock signal CLK. Refer now to FIG. 10, wherein a timing diagram of the signals in the embodiment shown in FIG. 9 is shown. At time point t1, the feedback signal FB is reduced to the reference voltage V1⁻, at this time the detection signal DET transits to high, and the control unit 104 immediately outputs the control signal Con_2 of a preset duration or a preset duty cycle Δt, allowing the feedback signal FB recover back to be above the reference voltage V1⁻. Then, the control unit 104 determines the starting time point and ending time point of the control signals Con_1, Con_2 based on the clock signal CLK, increasing the feedback voltage FB till the reference voltage V1⁺ is reached. In the present embodiment, if the load is heavy, causing the duration Δt to be not enough for providing sufficient energy storage, then as the feedback FB drops back to the reference voltage V1⁻ once again, the triggering circuit 120 will still be triggered, enabling the maintenance of the feedback signal FB above the reference voltage V1⁻.

Therefore, the DC/DC converter circuit according to the present invention can, upon detection of the output voltage being lower than a preset value, transfer the electric power to the output end immediately or within an acceptable duration of time, and performs energy storage on the output energy storing unit, allowing the output voltage to rise up. Compared with the prior art charge pump control circuit, as a result, the present invention can reduce voltage ripples.

As described above, the present invention completely fulfills the three requirements on patent application: innovation, advancement and industrial usability. In the aforementioned texts the present invention has been disclosed by means of preferred embodiments thereof; however, those skilled in the art can appreciate that these embodiments are simply for the illustration of the present invention, but not to be interpreted as for limiting the scope of the present invention. It is noted that all effectively equivalent changes or modifications on these embodiments should be deemed as encompassed by the scope of the present invention. Therefore, the scope of the present invention to be legally protected should be delineated by the subsequent claims.

What is claimed is:

1. A DC/DC converter circuit, comprising:
a capacitor, which is coupled to an input power source;
a switching circuit coupled to the capacitor through a first conducting path responsive to a first control signal;
an output energy storing unit coupled to the switching unit through a second conducting path responsive to a second control signal, the output energy storing unit providing electric power to a load; and
a controller coupled to the switching circuit for output of the first and second control signals thereto based on at least one clock signal and a feedback signal indicating a state of the output energy storing unit for transferring electric power from the input power source to the capacitor through the first conducting path, and from the capacitor to the output energy storing unit through the second conducting path;
wherein the controller determines whether the state of the output energy storing unit is in a first state or in a second state according to the feedback signal, and maintains an output of the first control signal, and the second control signal off when the output energy storing unit is in the first state, and responsive the output energy storing unit entering into the second state, the controller immediately switches the first control signal off and generates the second control signal for a time period irrespective of a contemporaneous phase of the at least one clock signal to transfer electric power from the capacitor to the output energy storing unit, following the time period, the controller again switches the first control signal off and generates the second control signal in synchronism with a phase of the at least one clock signal until the output energy storing unit reenters the first state for thereby reducing a ripple voltage to the load.

2. The DC/DC converter circuit according to claim 1, wherein the time period is defined by a preset duration of time or a preset duty cycle.

3. The DC/DC converter circuit according to claim 2, wherein the controller comprises: a detection unit, which generates a detection signal based on the feedback signal;
an oscillator, which generates the at least one clock signal; and
a control unit, which generates in time-division fashion the first control signal and the second control signal, the control unit determining whether to generate the first control signal based on the detection signal, and determining a starting time point and an ending time point of the first control signal based on the clock signal, and also determining whether to generate the second control signal based on the detection signal and the clock signal;
wherein, responsive to the output energy storing unit entering the second state, the control unit immediately generates the second control signal for the preset duration of time or the preset duty cycle.

4. The DC/DC converter circuit according to claim 3, wherein the detection unit comprises a hysteresis comparator.

5. The DC/DC converter circuit according to claim 3, wherein the control unit comprises a mono-stable circuit, and responsive to the output energy storing unit changing from the first state to the second state, the mono-stable circuit generates a pulse signal having the preset duration of time or the preset duty cycle.

6. The DC/DC converter circuit according to claim 1, wherein the control unit comprises:
   a detection unit, which generates a detection signal based on the feedback signal;
   an oscillator, which generates a plurality of clock signals, each clock signal having the same frequency with different phases; and
   a control unit, having a multiplexer for receiving the plurality of clock signals and selects to output one of the plurality of clock signals based on the detection signal, wherein the control unit generates the first control signal and the second control signal based on the selected clock signal and the detection signal.

7. The DC/DC converter circuit according to claim 6, wherein the detection unit comprises a hysteresis comparator.

8. The DC/DC converter circuit according to claim 6, wherein the oscillator generates two clock signals, and these two clock signals are opposite in phase.

9. The DC/DC converter circuit according to claim 8, wherein the control unit comprises a delay circuit which generates a clock delay signal based on one of the plurality of clock signals, and the multiplexer selects one of the plurality of clock signals for output based on the clock delay signal and the detection signal.

10. A DC/DC converter circuit, comprising: an input energy storing unit, which is coupled to an input power source;
   a switching circuit coupled to the input energy storing unit through a first conducting path responsive to a first control signal;
   an output energy storing unit coupled to the switching circuit through a second conducting path responsive to a second control signal, the output energy storing unit providing electric power to a load; and
   a controller, which controls the switching circuit based on a feedback signal indicating a voltage in the output energy storing unit, and the controller comprises:
   a detection unit, which generates a detection signal based on the feedback signal;
   an oscillator, which generates a plurality of clock signals, and each clock signal has the same frequency with different phases; and
   a control unit, which includes a multiplexer and a signal generating circuit, the multiplexer having inputs respectively coupled to the detection unit for receiving the detection signal and the oscillator for receiving the plurality of clock signals and selects and outputs one of the plurality of clock signals to the signal generating circuit responsive to the detection signal, the signal generating circuit generating the first control signal and the second control signal based on the selected clock signal and the detection signal, wherein the first control signal controls the switching circuit to allow the input power source to transfer the electric power to the input energy storing unit, and the second control signal controls the switching circuit to allow the input energy storing circuit to transfer the electric power to the output energy storing unit.

11. The DC/DC converter circuit according to claim 10, wherein the control unit selects one of the plurality of clock signals for output based on the phases of the plurality of clock signals.

12. The DC/DC converter circuit according to claim 11, wherein the oscillator generates two clock signals, and these two clock signals are opposite in phase.

13. The DC/DC converter circuit according to claim 12, wherein the control circuit further comprises a latch circuit, and the latch circuit is coupled to the oscillator, the detection unit and the multiplexer, and generates a selection signal based on the detection signal and the two clock signals, controlling the multiplexer to select one of the two clock signals for output.

14. The DC/DC converter circuit according to claim 13, wherein the control circuit further comprises a delay circuit, which is coupled between the latch circuit and the oscillator, and delays one of the plurality of clock signals and then has it inputted to the latch circuit.

15. The DC/DC converter circuit according to claim 11, wherein the detection unit comprises a hysteresis comparator.

16. A charge pump controller used to control a switching circuit in a charge pump circuit, which charge pump controller comprises:
   a detection unit, which generates a detection signal based on a feedback signal indicating the state of a load;
   an oscillator, which generates a plurality of clock signals, and each clock signal has the same frequency with different phases; and
   a control unit, which includes a determination selection circuit and a signal generating circuit, the determination selection circuit having inputs respectively coupled to the detection unit for receiving the detection signal and the oscillator for receiving the plurality of clock signals and outputting one of the clock signals as a reference clock signal to the signal generating circuit based on phases of the clock signals and the detection signal, the signal generating circuit controlling the switching of the switching circuit based on the reference clock signal and the detection signal;
   wherein, the determination selection circuit then re-selects one of the clock signals as the reference clock signal based on the detection signal responsive to the feedback signal indicating that a voltage output of the charge pump circuit is lower than a preset voltage value.

17. The charge pump controller according to claim 16, wherein the determination selection circuit comprises a multiplexer for receiving the plurality of clock signals, and selecting one of the plurality of clock signals for output based on the detection signal.

18. The charge pump controller according to claim 17, wherein the controls unit selects one of the plurality of clock signals for output based on the phases of the plurality of clock signals.

19. The charge pump controller according to claim 18, wherein the oscillator generates two clock signals, and these two clock signals are opposite in phase.

20. The charge pump controller according to claim 19, wherein the control circuit further comprises a latch circuit, and the latch circuit is coupled to the oscillator, the detection unit and the multiplexer, and generates a selection signal based on the detection signal and the two clock signals, controlling the multiplexer to select one of the two clock signals for output.

21. The charge pump controller according to claim 20, wherein the control circuit further comprises a delay circuit, which is coupled between the latch circuit and the oscillator, and delays one of the plurality of clock signals and then has it inputted to the latch circuit.

* * * * *